United States Patent [19]

Alessio

[11] 4,098,351

[45] Jul. 4, 1978

[54] HAMMER TOOL

[75] Inventor: Lorenzo Ercole Alessio, Lecco, Italy

[73] Assignee: The Black and Decker Manufacturing Company, Towson, Md.

[21] Appl. No.: 820,284

[22] Filed: Jul. 29, 1977

[30] Foreign Application Priority Data

Aug. 9, 1976 [IT] Italy .............................. 26154 A/76

[51] Int. Cl.$^2$ .............................................. B23Q 5/027

[52] U.S. Cl. ......................................... 173/13; 173/48; 173/104; 74/56

[58] Field of Search ................... 173/13, 48, 104, 109, 173/47; 74/56, 57

[56] References Cited

U.S. PATENT DOCUMENTS

| | | | |
|---|---|---|---|
| 3,736,992 | 6/1973 | Zander et al. | 173/48 |
| 3,809,168 | 5/1974 | Fromm | 173/13 |
| 3,998,278 | 12/1976 | Stiltz et al. | 173/48 |

*Primary Examiner*—Robert A. Hafer
*Attorney, Agent, or Firm*—Walter Ottesen; Leonard Bloom; Edward D. Murphy

[57] ABSTRACT

A hammer tool such as a rotary hammer, hammer drill or the like includes a motor housing and a gear case secured to the motor housing forwardly of the motor housing. A motor in the motor housing has a shaft projecting into the gear case and a pinion formed on the end of the motor shaft. A first set of ratcheting teeth is formed on a body rotatably journaled in the gear case. An output spindle for holding a tool bit is provided and has a longitudinal axis. The output spindle is rotatably journalled in the gear case so as to be also slideable in the direction of said longitudinal axis. A second set of ratcheting teeth is mounted on the output spindle so as to be in confronting relation to the first set of ratcheting teeth. A spring provides a resilient force for holding the first and second sets of ratcheting teeth in spaced apart relation to each other. A gear transmission is operatively connected to the pinion for simultaneously rotating the first set of ratcheting teeth at a predetermined first angular velocity and for rotating the second set of ratcheting teeth at a predetermined second angular velocity whereby one of the sets of ratcheting teeth ratchets over the other one of the sets of ratcheting teeth thereby imparting longitudinal impact blows to the output spindle when the first set of ratcheting teeth and the second set of ratcheting teeth mutually engage in response to an axial movement of the output spindle caused by the tool being pressed toward a work surface against the resilient force developed by the spring.

51 Claims, 9 Drawing Figures

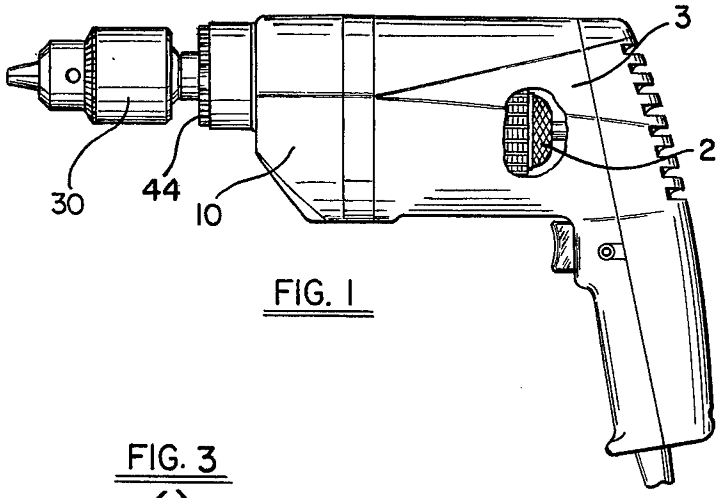
FIG. 1
FIG. 3
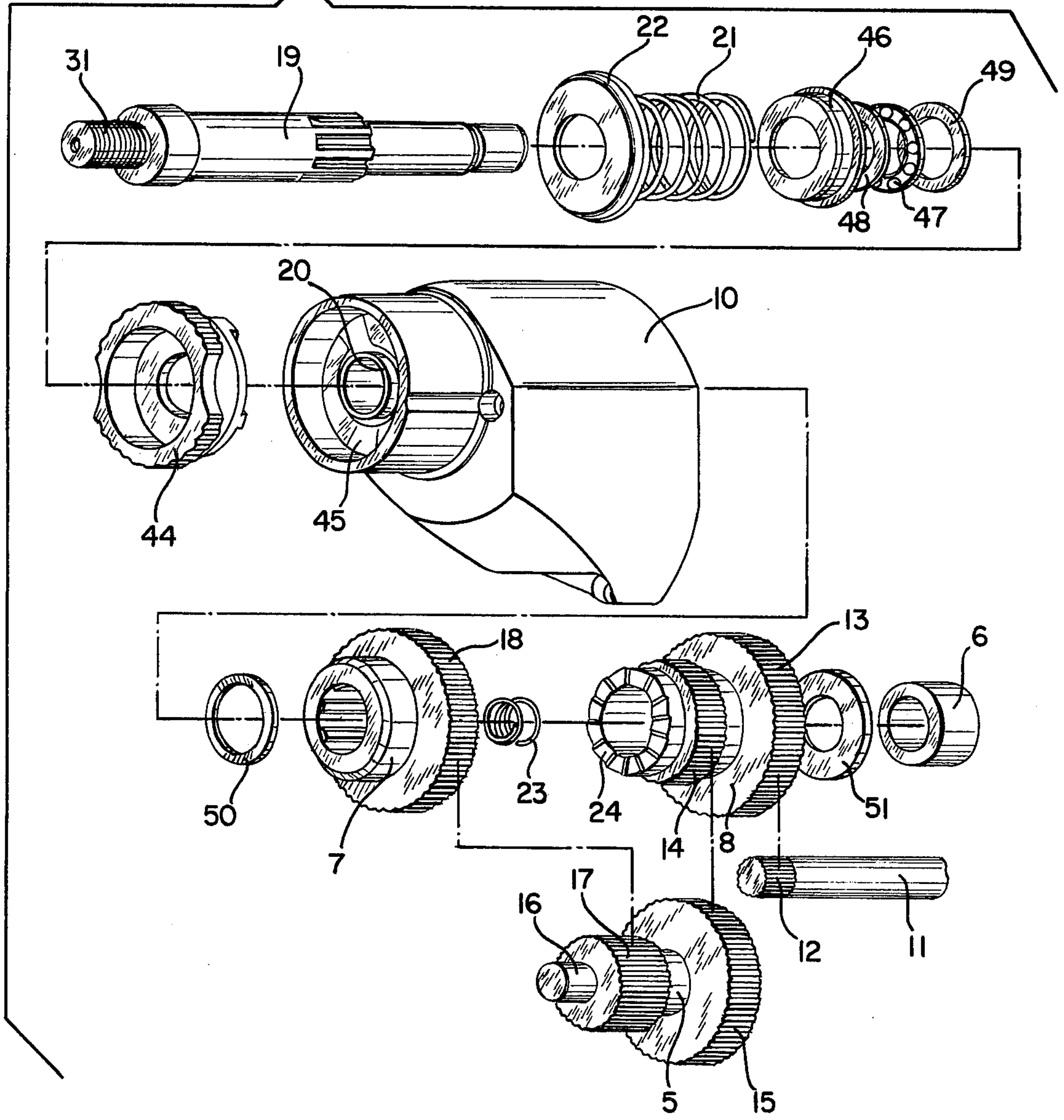

HAMMER TOOL

BACKGROUND OF THE INVENTION

Drills, generally of the portable type, are known wherein the output spindle on which the chuck is mounted performs a rotary movement as well as an axial reciprocating movement. The percussion effect resulting from such an axial reciprocating movement provides advantages when perforating materials having a tendency to crumble as opposed to materials which can be drilled by conventional methods involving the removal of chips in the course of the cutting action. Concrete stone, and the like are materials which tend to crumble.

As a rule, the axial reciprocating movement is brought about through the interaction of two sets of ratchet teeth shaped in the form of a cam, with one element being integral with the stationary portion of the drill while the other one is integral with the output spindle shaft. The axial pressure that is exerted by the operator onto the bit during the drilling operation causes the output spindle to bring the movable set of rachet teeth in contact with the stationary set of ratchet teeth. The overlapping of the respective sets of teeth of suitable profile results in a successive moving away of the output spindle shaft and the set of ratchet teeth mounted thereon. The respective sets of teeth are caused to reestablish contact through the pressure exerted by the operator on the drill so that the successive engagements of the teeth sets produces a beating action that is causing, in turn, the percussion of the output spindle and the chuck and tool bit mounted on the output spindle.

Such a mode of operation presupposes that the entire body of the drill constitutes the inertial reaction mass of the percussion effort of the output spindle, chuck and tool bit.

The shape of the stationary and movable ratchet teeth can generally be that of a sawtooth profile in which the inclined sections constitute the impact surfaces. The result is that the reaction on the stationary gear is not axial but has, on the contrary, an axial component and a tangential component on the plane perpendicular to the axis of the output spindle. Both of these components are rigidly transmitted to the body of the conventional hammer-drill.

It ought to be pointed out likewise that the above-mentioned conventional configuration of the percussion drill takes into account as a necessary consequence that the number of percussions per revolution of the output spindle be defined solely by the number of teeth of the stationary set of ratchet teeth and the rotating set of ratchet teeth. It follows from this premise that the percussion frequency is a linear function of direct proportionality to the speed of rotation of the output spindle which may not be desirable in all instances. Moreover, another inevitable consequence is that each percussion or impact blow may be in a well-defined angular position of the output spindle shaft; whereas, it would be advantageous to have a continuous variability so as to attack, in changing positions, the material subjected to the percussion force. By continously varying the angular positions at which the bit strikes the workpiece, such as concrete for example, a round bore is obtained rather than one which takes on the general contour of bit. This prevents the bit from binding in the workpiece.

SUMMARY OF THE INVENTION

It is an object of my invention to provide a hammer tool wherein the frequency of the impact blows received by the output spindle can be selected by appropriate design of the gear transmission arrangement. Subsidiary to this object, it is another object of my invention to provide a hammer tool wherein this frequency can be selected independently of the speed of the output spindle.

It is another object of the invention to provide a hammer tool wherein the angular position of the shaft in which the percussions occur is varied with each revolution of the output spindle.

Moreover, it is an object of the invention to make it possible to reduce the intensity of vibration of the housing of the hammer tool during the percussion, thereby making the tool more comfortable to operate and reducing the hazards to which the components making up the tool are subjected.

The hammer tool of the invention can be a rotary hammer, hammer-drill or the like. Hammer tools of this type are equipped with an output spindle for holding a tool bit. The output spindle has a longitudinal axis and is rotatably journaled in the gear case of the tool so as to be also slideable in the direction of the longitudinal axis.

According to a feature of the invention, a first set of ratchet teeth are formed on a body also rotatably journalled in the gear case. A second set of ratchet teeth are mounted on the output spindle for transmitting impact blows thereto when the two sets of ratchet teeth come together. The two sets of ratchet teeth are in confronting relation to each other. Resilient means such as a spring holds the first and second sets of ratchet teeth in spaced apart relation to each other.

Another feature of the invention is a gear transmission operatively connected to the pinion of the motor of the tool for simultaneously rotating the first set of ratchet teeth at a predetermined first angular velocity and for rotating the second set of ratchet teeth at a predetermined second angular velocity whereby one of the sets of ratchet teeth ratchets over the other one of the sets of ratchet teeth thereby imparting longitudinal impact blows to the output spindle when the first set of ratchet teeth and the second set of ratchet teeth mutually engage in response to an axial movement of the output spindle caused by the tool being pressed toward a work surface against the resilient force developed by the resilient means.

The difference between the first predetermined angular velocity and the second predetermined angular velocity is the differential angular velocity. According to another feature of the invention the gear transmission means including gear means for causing the differential angular velocity to have a value which will cause the impact blows per revolution of the output spindle to be a non-integer number. Preferably, the non-integer number is greater than 1.

Still another feature of the invention is that the gear transmission means includes gear means for causing the predetermined first angular velocity to be greater than the predetermined second angular velocity.

BRIEF DESCRIPTION OF THE DRAWING

The foregoing objects and advantages of my invention will become more apparent from consideration of the detailed description to follow taken in conjunction with the drawing annexed hereto wherein;

FIG. 1 is an elevation view of a hammer-drill according to the invention;

FIG. 3 is an assembly view of the gear reduction arrangement of FIG. 2;

DESCRIPTION OF THE PREFERRED EMBODIMENTS OF THE INVENTION

Figure 2:
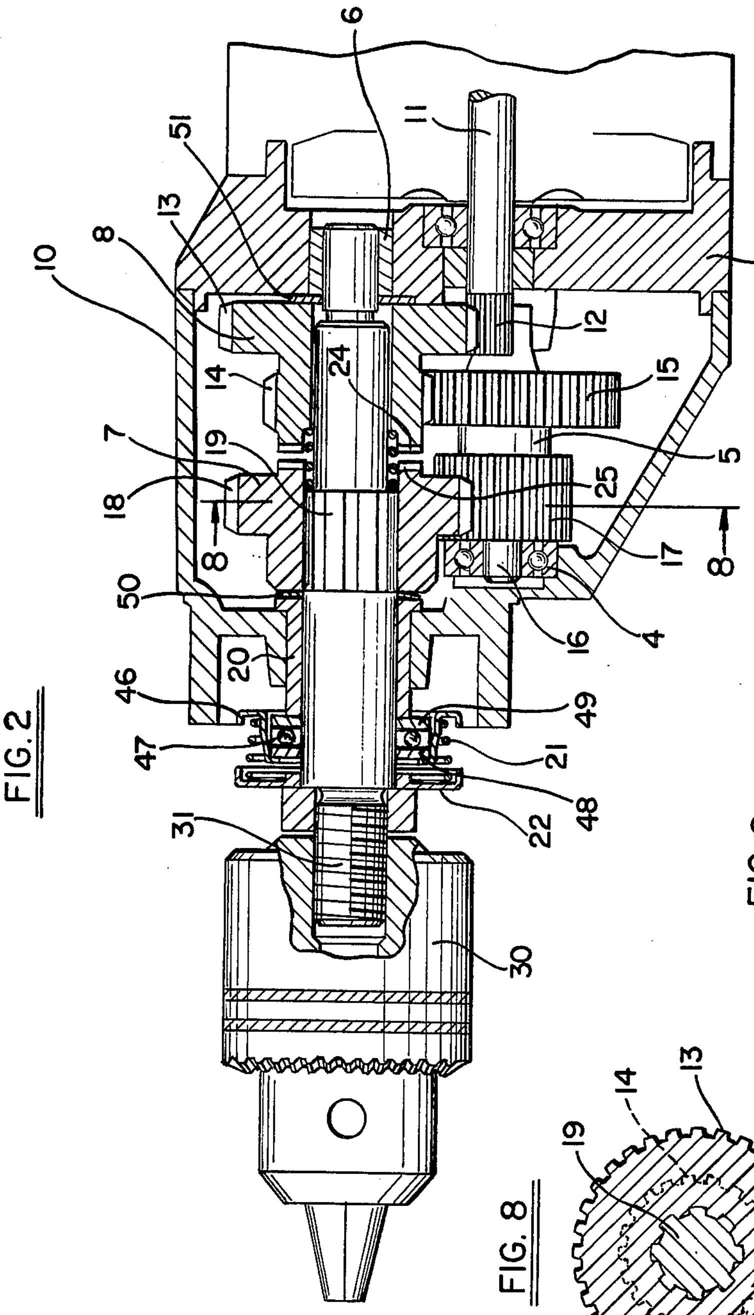
FIG. 2 is an elevation view, partially in section, showing the gear case of a single-speed hammer-drill containing a reduction gear arrangement connected to the motor shaft for rotating the ratchet teeth sets at predetermined angular velocities.

FIG. 1 illustrates a hammer-drill according to the invention designated by reference numeral 1 and having a gear case 10 and a drive motor 2 contained within a motor housing 3.

FIG. 2 illustrates the gear case of the hammer-drill of FIG. 1 and is again designated by reference numeral 10. The shaft 11 of the rotor of the drive motor extends into the gear case 10. Gears 13 and 14 are formed on a unitary gear body 8 which is mounted on shaft 19 so as to be rotatable with respect thereto. A pinion 12 is formed on the end of the shaft 11 to engage with the gear 13 to rotate the gear 13 and gear body 8 on shaft 19. The second gear 14, in turn, engages gear 15. Gear 15 and gear 17 are coaxial and conjointly define a gear body 5 which is fixedly mounted on intermediate shaft 16 so as to be rotatable therewith. The shaft 16 is rotatably journaled in bearing 4 in gear case 10 and a bearing (not shown) in the gear-case cover 9. The gear 17 engages gear 18 integrally connected to the shaft 19. A chuck 30 threadably engages a threaded front-end extension 31 of shaft 19. The shaft 19 is rotatably supported in bearings 20 and 6 and constitutes the output spindle. The shaft 19 is further held in bearings 20 and 6 so as to be axially slideable therein in the direction of the longitudinal axis of the shaft. An axial thrust is exerted upon the shaft 19 by a spring 21 which is compressed between the gear case 10 and a cup-shaped collar 22 mounted on the shaft proper. Cup-shaped piece 46 contains a thrust bearing 47 and flat washers 48 and 49. Reference numerals 50 and 51 indicate a Belleville spring and a flat washer, respectively.

Figure 9:
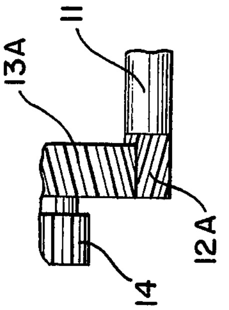
FIG. 9 illustrates a helical gear configuration for the motor pinion and the gear with which the pinion engages.

Another spring 23 is compressed between gear body 8 and gear body 7 on which gear 18 is formed. If indeed it is desired to use the drill for the purpose of drilling operations without percussion motion, it is known in the art to provide means to block the axial movement of the chuck shaft 19 subjected to the drilling pressure. Under such conditions and especially if the drill is held in vertical position, the gear body 8 can descend of its own weight so as to cause ratchet teeth 24 and 25 to mutually engage producing noise. The spring 23 eliminates such a disadvantage. This disadvantage could, however, be obviated in other ways, for example, by designing the gear 13 with a helical gear engaging the pinion 12 that is inclined in a direction to generate on the gear body 8 at gear 13 an axial thrust that moves the same away from the wheel 18. Such an arrangement is shown in FIG. 9 wherein a helical gear 13A on the body 8 is engaged by a corresponding helical pinion gear 12A.

A perspective assembly view of the reduction gear arrangement of FIG. 2 is shown in FIG. 3. The gear reduction arrangement is configured so that the gear 13 rotates faster than the gear 18. Collar 44 (not shown in FIG. 2) coacts with recesses 45 formed in the gear-case cover 10 as explained in Italian patent application No. 24323 A/75 filed on June 12, 1975 as well as in Italian Utility Model Application No. 21671 B/75 likewise filed on June 12, 1975.

A set of ratchet teeth 24 are formed on the front end-face of gear body 8 and are dimensioned so as to engage with a corresponding second ratcheting means in the form of a set of ratchet teeth 25 formed on the back end-face of gear 18. The ratchet teeth 24 and 25 are preferably beveled so as to mutually overlap when the bear body 8 and the body 7 of gear 18 are forced toward one another while rotating at different angular velocities. Suitable are for instance teeth 24 having a sawtooth configuration as shown in FIG. 3 which take into account the fact that gear 13 rotates faster than the gear 18 and, therefore, that the teeth 24 rotate faster than the teeth 25.

The spring 21 constitutes resilient means and develops a resilient force between the gear case 10 and the spindle shaft 19 to resiliently hold the ratchet teeth sets 24 and 25 in spaced apart relation to each other. As mentioned, a spring 23 can also be added if desired to prevent the gear body 8 from falling down upon the gear body 7 of gear 18 when the tool is in the vertical position.

Generally, it should be pointed out that the end-face teeth indicated by reference numerals 24 and 25 are of cam-like configuration so that when these teeth mutually engage, a ratcheting effect is achieved which causes the shaft 19 to reciprocate when the hammer-drill is placed under load by the operator of the tool. When the operator presses the tool toward a work surface he overcomes the resilient force developed by the resilient means 21 and the teeth sets 24 and 25 to ratchet. The operator must also overcome the resilient force of spring 23 if it should be present in which case it too can be considered as being part of the resilient means.

Figure 8:
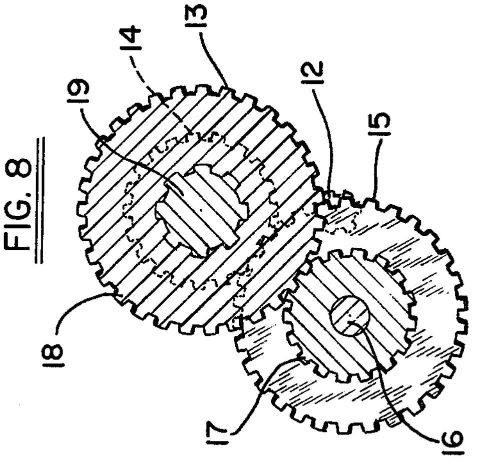
FIG. 8 is a section view taken along line 8—8 of FIG. 2.

The rotational movement is imparted to the shaft 19 through three pairs of cascade-type reduction gears, namely: the gear parts 12–13, 14–15, and 17–18. FIG. 8 is a section view taken along line 8—8 of FIG. 2 and shows the disposition of these gears.

At the instant an axial force acts upon the chuck 30, the entire shaft 19 will slide toward the right. The body 7 of gear 18 bears with its teeth 25 on the teeth 24 of the gear body 8 thereby initiating a percussion effect each time teeth 25 overlap the teeth 24 as they rotate at different angular velocities. When the axial force is interrupted, as for example when the hammer-drill is lifted off of the workpiece, the spring 21 and spring 23 act to move the ratchet teeth sets 24 and 25 apart as shown in FIG. 2.

The relative angular velocity between the teeth 24 and 25 differs from the absolute angular velocity of the shaft 19 of the chuck and is governed by the reduction gear pairs 14–15 and 17–18. The percussion frequency is a function of the number of teeth and the relative angular velocity between the teeth 25 and the teeth 24. More specifically and assuming that gear bodies 7 and 8 both have the same number of teeth $t$ the number of strokes $n$ per minute is given by the equation:

$$n = t\,(w_a - w_b) = tw_d$$

where $w_a$ and $w_b$ are the angular velocities of gear bodies 8 and 7, respectively. $w_d$ is the relative or differential angular velocity.

By appropriately configuring the speed reduction gears, the most suitable percussion frequency can be achieved and maximum freedom for the design of the teeth 24 and 25 is achieved. Thus, these teeth can be provided with an optimum tooth configuration with respect to tooth height, flank inclination and, accordingly, the number of teeth.

According to a preferred embodiment of my invention, the gear reduction arrangement is designed to provide a differential angular velocity $w_d$ which will cause the number of impact blows per revolution of the output spindle shaft 19 to be a non-integer member. Preferably, the number of blows per revolution of the output shaft is an integral number plus a fraction. In this way, the angular position of the shaft 19 of the chuck 30 at which a percussion impluse is received is varied continuously so that the bore hammer-drilled by the tool into a workpiece such as concrete is a clean round bore.

The particular dynamic equilibrium generated by the structure of the invention should be noted. The reaction force generated by the teeth 24–25 is transmitted to the gear body 8 rather than directly to the hammer-drill housing.

The placement of gear body 8 between the gear 18 and the gear case 10 affords special advantages because the gear body 8 has a mass having its own inertia and revolving at considerable angular speed. It has been shown that this arrangement according to the invention substantially attenuates the vibrations that, in conventional drills, affect the housing as a whole and do therefore transmit vibrations to the handle and thereby to the operator. Attention is called to the fact that in a conventional hammer-drill, one set of teeth are fixedly connected to the gear case and the vibration of the ratcheting teeth are transmitted directly to the operator when the tool is operated in the hammer mode.

The greater the mass of the gear body 8, the more efficient will be the system because more rotational energy is stored between blows. The gear reduction arrangement shown in FIG. 2 is preferably designed so that gear body 8 rotates in the same angular direction as the gear body 7 on the output shaft 19. In addition, the gear body 8 and teeth 24 rotate at a greater angular velocity then the gear body 7 and teeth 25 so that the rotating spindle shaft 19 receives an assist in its rotation into the workpiece as a consequence of the teeth 24 ratcheting over the teeth 25.

The tangential component of the force exerted on the ratchet teeth 24 is taken up by the engagement of the driving pinion 12 with the gear 13. The ratchet teeth 24 can be seen in the assembly view of FIG. 3.

It is possible that a different kinematic chain be utilized to connect the driving pinion 12 to the output spindle 19 without affecting the rotary mass borne by the reaction gear body 8 which can be independently driven by taking its rotary movement from any motor-to-output spindle transmission drive.

Figure 4:
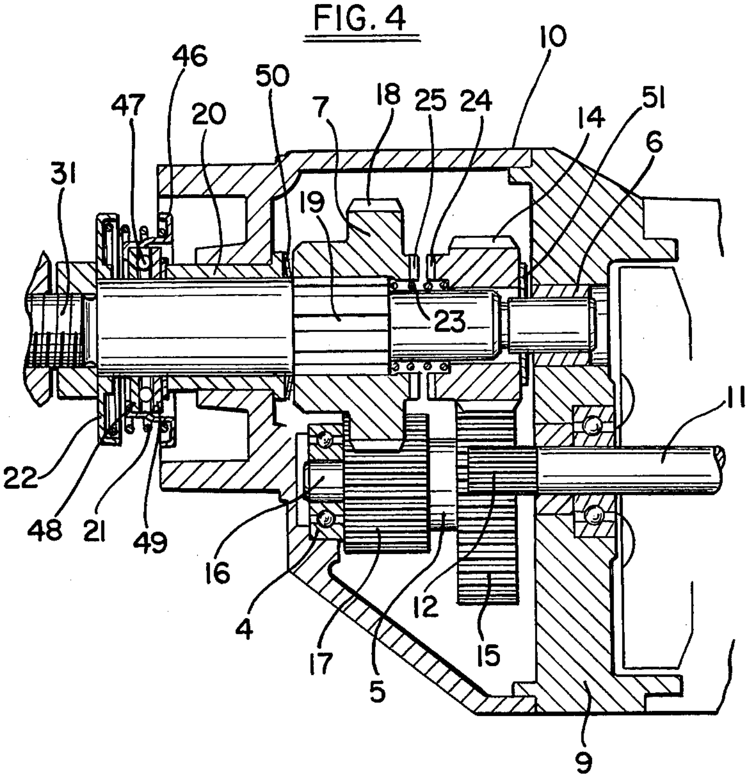
FIG. 4 is an elevation view, partially in section showing the gear case of a single-speed hammer-drill containing a simplified reduction gear arrangement requiring less gears than the embodiment shown in FIGS. 2 and 3.

By way of example, FIG. 4 illustrates another embodiment incorporating the principle referred to above wherein the pinion 12 engages directly with the gear 15 which, in turn, meshes with the gear 14 on which there has been machined the front ratchet teeth 24. This eliminates the gear 13 of the embodiment of FIG. 2. In this way, the ratchet teeth 24 are driven by a transmission 12-15-14, and the output spindle 19 by a transmission 12-15-17-18.

Figure 5:
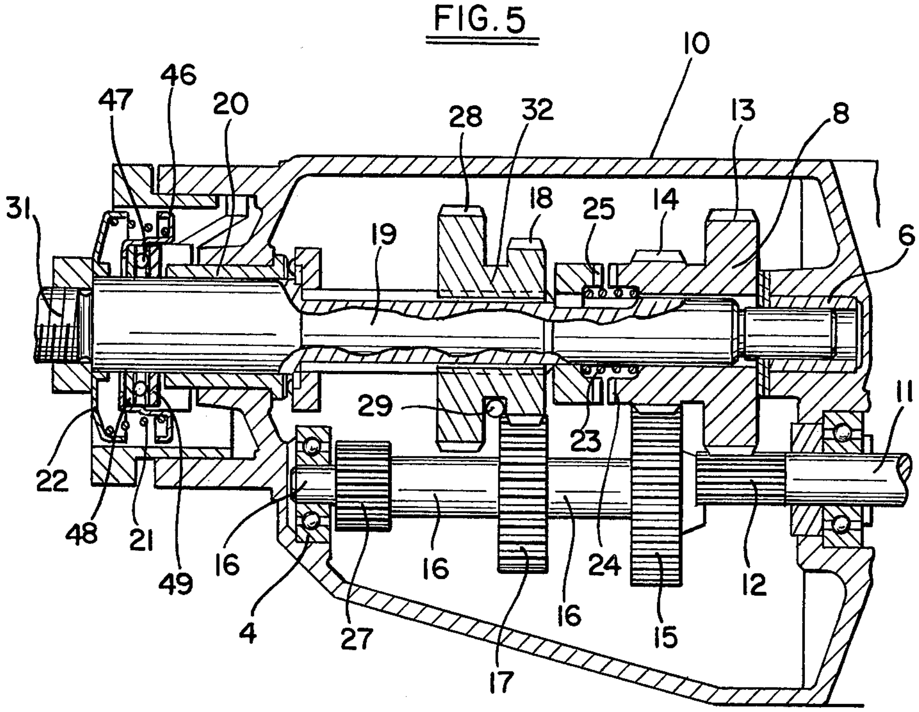
FIG. 5 is an elevation view, partially in section, showing the gear case of a two-speed hammer-drill containing a reduction gear arrangement connected to the motor shaft for rotating the ratchet teeth sets at predetermined angular velocities.

FIG. 5 illustrates a reduction gear arrangement equipped with alternate gear ratios. In this embodiment, the intermediate shaft 16 includes gears 17 and 27. The gear 18 is integral with a gear 28 and the assembly is slidably mounted on the shaft 19 whereas the gear body 32 of gears 18 and 28 is constrained to rotate with the shaft 19.

Figure 6:
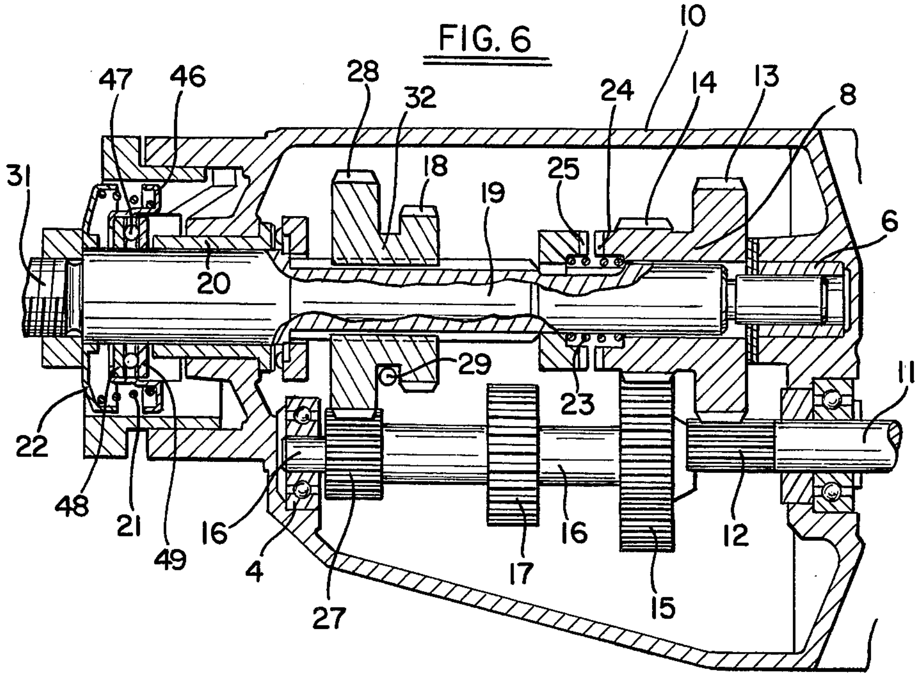
FIG. 6 shows the two-speed hammer-drill of FIG. 6 wherein a gear body has been shifted to cause the hammer-drill to be operable at a different speed.

A control lug 29 is capable of moving the gear body 32 from the position shown in FIG. 5 to the position illustrated in FIG. 6 for the purpose of respectively connecting the gear 17–18 and the gears 27–28. In this way, it is possible to change the speed of the output spindle 19. The ratcheting means 25 is separately attached to the output spindle 19.

It can be noted that, with such an arrangement, the frequency of the percussions decreases with the increase in the speed of the output spindle 19, which is slower than the gear 13 and gear body 8 upon which ratcheting means 24 are formed. This effect may not be unwelcome in view of the fact that the drilling of relatively soft material in which the tool can operate at higher speed does not necessarily call for a very high percussion frequency. Thus, according to a further feature of the invention speed changing means can be provided for changing the differential angular velocity thereby causing the number of impact blows per revolution of the output spindle 19 imparted to the output spindle 19 to be changed.

As stated above, the gearing for the reduction of the revolutions between the drive shaft 11 and the output spindle 19 can have any other configuration, and the ratcheting arrangement for imparting impacting blows to the output spindle 19 can likewise be of a different configuration.

According to still another embodiment of the invention, at least one of the gear bodies on which a set of ratcheting teeth are formed is mounted on the output spindle shaft 19 so as not be be integral therewith, it being adequate if this gear body is mounted to transmit precisely the axial percussion pressure applied to the output spindle 19. Therefore, the ratcheting teeth can be disposed at an end-face of a gear body that is rotatably mounted on the output spindle and is rotatively driven with respect to the output spindle by its own gearing at a speed different from that of the output spindle or from that of the reaction gear containing the other set of ratchet teeth.

Figure 7:
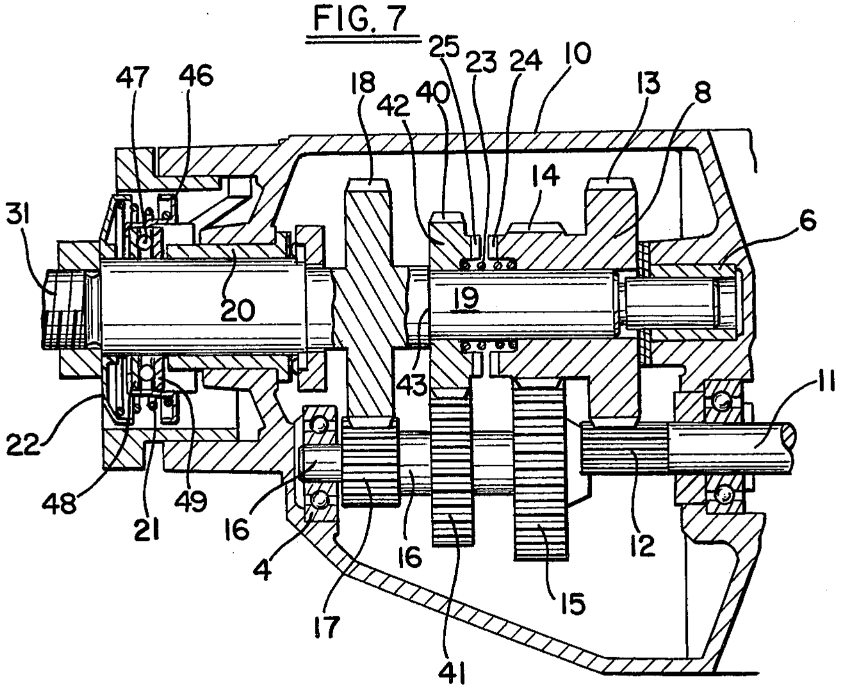
FIG. 7 illustrates a single-speed hammer-drill equipped with a gear transmission arrangement that rotates the output spindle shaft at a different angular velocity than either one of the sets of ratcheting teeth.

FIG. 7 illustrates such an arrangement in which the ratchet teeth 25 are formed on an end-face of the wheel 42 of gear 40. The wheel 42 is placed idly on the shaft 19 so that wheel 42 can rotate relative to the shaft 19. The wheel 42 is held however axially by a shoulder 43 formed on the shaft 19. The wheel 42 is independently driven by a gear 42 of the shaft 16 and the percussion frequency is completely independent of the speed of the output spindle shaft 19 and therefore remains constant upon varying the reduction ratio of the gear coupling 17-18. The wheel 42 includes the ratchet teeth 25 and is axially fixed on the output spindle 19. The ratchet teeth 25 react on a complementary set of ratchet teeth 24 formed on a revolving gear body 8 of considerable mass, according to the principles discussed above whereby the rotating mass 8 contributes to alternating vibrations transmitted to the gear case and operator of the tool as well as provides an assist to output spindle in its rotation into the workpiece.

I claim:

1. A portable hammer tool such as a rotary hammer, hammer drill or the like comprising:

a motor housing;

a gear case secured to said motor housing forwardly of said motor housing;

a motor in said motor housing having a shaft projecting into said gear case;

a pinion formed on the end of said motor shaft;

first ratcheting means rotatably journaled in said gear case;

an output spindle for holding a tool bit, said output spindle having a longitudinal axis and being rotatably journalled in said gear case so as to be also slideable in the direction of said longitudinal axis;

second ratcheting means fixedly mounted to said output spindle so as to be in confronting relation to said first ratchet means;

resilient means providing a resilient force for holding said first and said second ratcheting means in spaced apart relation to each other; and, gear transmission means operatively connected to said pinion for simultaneously rotating said first ratcheting means at a predetermined first angular velocity and for rotating said second ratcheting means at a predetermined second angular velocity whereby one of said ratcheting means ratchets over the other one of said ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means.

2. The portable hammer tool of claim 1, wherein the difference between said first predetermined angular velocity and said second predetermined angular velocity is the differential angular velocity, said gear transmission means including gear means for causing said differential angular velocity to have a value which will cause the impact blows per revolution of said output spindle to be a non-integer number.

3. The portable hammer tool of claim 2, said non-integer number being greater than 1.

4. The portable hammer tool of claim 1, said gear transmission means including gear means for causing said predetermined first angular velocity to be greater than said predetermined second angular velocity.

5. The portable hammer tool of claim 4, wherein the difference between said first predetermined angular velocity and said second predetermined angular velocity is the differential angular velocity, said gear transmission means further including means for causing said differential angular velocity to have a value which will cause the impact blows per revolution of said output spindle to be a non-integer number.

6. The portable hammer tool of claim 5, said non-integer number being greater than 1.

7. A portable hammer tool such as a rotary-hammer, hammer-drill or the like comprising:

a motor housing;

a gear case cover secured to said motor housing;

a gear case secured to said motor housing forwardly of said gear case cover;

a motor in said motor housing having a shaft journaled in said gear case cover and projecting within said gear case;

a pinion formed on the end of said motor shaft;

an output spindle for holding a tool bit, said output spindle having a longitudinal axis and being rotatably journaled in said gear case so as to be also slideable in the direction of said longitudinal axis;

first ratcheting means mounted on said output spindle so as to be rotatable with respect thereto;

second ratcheting means fixedly mounted on said output spindle axially of said first ratcheting means so as to be in confronting relation to the latter;

resilient means for resiliently holding said first and second ratcheting means in spaced apart relation to each other; and, gear transmission means operatively connected to said pinion for simultaneously rotating said first ratcheting means at a predetermined first angular velocity and for rotating said second ratcheting means at a predetermined second angular velocity whereby one of said ratcheting means ratchets over the other one of said ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means.

8. The portable hammer tool of claim 7 wherein the difference between said first predetermined angular velocity and said second predetermined angular velocity is the differential angular velocity, said gear transmission means including gear means for causing said differential angular velocity to have a value which will cause the impact blows per revolution of said output spindle to be a non-integer number.

9. The portable hammer tool of claim 8, said non-integer being greater than 1.

10. The portable hammer tool of claim 7, said gear transmission means including gear means for causing said predetermined first angular velocity to be greater than said predetermined second angular velocity.

11. The portable hammer tool of claim 10, wherein the difference between said first predetermined angular velocity and said second predetermined angular velocity is the differential angular velocity, said gear transmission means further including means for causing said differential angular velocity to have a value which will cause the impact blows per revolution of said output spindle to be a non-integer number.

12. The portable hammer tool of claim 11, said non-integer number being greater than 1.

13. A portable hammer tool such as a rotary hammer, hammer drill or the like comprising:

a motor housing;

a gear case cover secured to said motor housing;

a gear case secured to said motor housing forwardly of said gear case cover;

a motor in said motor housing having a shaft journaled in said gear case cover and projecting within said gear case;

an output spindle for holding a tool bit, said output spindle having a longitudinal axis and rotatably journaled in said gear case so as to be also slideable in the direction of said longitudinal axis;

a gear body having at least two gears formed thereon and mounted on said output spindle so as to be rotatable with respect thereto;

a pinion formed on the end of said motor shaft and engaging a first one of said two gears on said gear body;

a third gear fixedly disposed on said output spindle so as to be rotatable therewith;

an intermediate shaft journaled in said gear case on an axis parallel to, and radially offset from, said output spindle;

a pair of spaced-apart gears of predetermined size carried by said intermediate shaft, one of said gears of said pair being in mesh with the second one of said two gears of said gear body and the other one of said gears of said pair being in mesh with said third gear;

first ratcheting means formed on one end-face of said gear body;

second ratcheting means fixedly disposed on said output spindle axially of said first ratcheting means so as to be in confronting relation to the latter;

resilient means for resiliently holding said first and second ratcheting means in spaced apart relation to each other; and, each of said gears being dimensioned so as to cause said gear body to rotate at an angular velocity faster than said output spindle thereby causing said first ratcheting means to ratchet over said second ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means.

14. A portable hammer tool such as a rotary-hammer, hammer-drill or the like comprising:

a motor housing;

a gear case secured to said motor housing forwardly of said gear case cover;

a motor in said motor housing having a shaft projecting into said gear case;

a body of predetermined mass rotatably journaled in said gear case;

first ratcheting means formed on said body;

an output spindle for holding a tool bit, said output spindle having a longitudinal axis and being rotatably journaled in said gear case so as to be also slideable in the direction of said longitudinal axis;

second ratcheting means mounted on said output spindle axially of said first ratcheting means so as to be in confronting relation to the latter;

resilient means for resiliently holding said first and second ratcheting means in spaced apart relation to each other;

first kinematic means for kinematically connecting said body to said motor shaft and for rotating said body and said first ratcheting means at a predetermined first angular velocity; and, second kinematic means for kinematically connecting said output spindle to said motor shaft and for rotating said output spindle at a predetermined second angular velocity whereby one of said ratcheting means ratchets over the other one of said ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means.

15. The portable tool of claim 14, said first kinematic means and said second kinematic means being a gear transmission having gear ratios selected to cause said predetermined first angular velocity to be greater than said predetermined second angular velocity.

16. The portable tool of claim 15 wherein the difference between said first predetermined angular velocity and said second predetermined angular velocity is the differential angular velocity, said gear ratios being further selected to cause said differential angular velocity to have a value which will cause the impact blows per revolution of said output spindle to be a non-integer number.

17. The portable tool of claim 14, said first kinematic means comprising:

a pinion formed on the end of said shaft projecting into said gear case; and, a first gear formed on said body and meshing with said pinion.

18. The portable tool of claim 17, said second kinematic means comprising:

said first kinematic means;

a second gear formed on said body;

a third gear fixedly disposed on said output spindle so as to be rotatable therewith;

an intermediate shaft journaled in said gear case on an axis parallel to, and radially offset from, said output spindle; and, a pair of spaced-apart gears of predetermined size carried by said intermediate shaft, one of said gears of said pair being in mesh with the second one of said two gears of said gear body and the other one of said gears of said pair being in mesh with said third gear.

19. The portable tool of claim 18, the gear ratio of said first kinematic means and the gear ratios of said second kinematic means being selected to cause said predetermined first angular velocity to be greater than said predetermined second angular velocity.

20. The portable tool of claim 19, wherein the difference between said first predetermined angular velocity and said second predetermined angular velocity is the differential angular velocity, said gear ratios being further selected to cause said differential angular velocity to have a value which will cause the impact blows per revolution of said output spindle to be a non-integer number.

21. A portable hammer tool such as a rotary hammer, hammer drill or the like comprising:

a motor housing;

a gear case secured to said motor housing forwardly of said motor housing;

a motor in said motor housing having a shaft projecting into said gear case;

a pinion formed on the end of said motor shaft;

first ratcheting means rotatably journaled in said gear case;

an output spindle for holding a tool bit, said output spindle having a longitudinal axis and being rotatably journalled in said gear case so as to be also slideable in the direction of said longitudinal axis;

second ratcheting means mounted on said output spindle so as to be in confronting relation to said first ratchet means;

resilient means providing a resilient force for holding said first and said second ratcheting means in spaced apart relation to each other; and, gear transmission means operatively connected to said pinion for simultaneously rotating said first ratcheting means at a predetermined first angular velocity and for rotating said second ratcheting means at a predetermined second angular velocity whereby one of said ratcheting means ratchets over the other one of said ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means, said gear transmission means also including means for rotating said output spindle at a predetermined third angular velocity.

22. The portable hammer tool of claim 1, wherein the difference between said first predetermined angular velocity and said second predetermined angular velocity is the differential angular velocity, said gear transmission means including gear means for causing said differential angular velocity to have a value which will cause the impact blows per revolution of said output spindle to be a non-integer number.

23. The portable hammer tool of claim 22, said non-integer member being greater than 1.

24. The portable hammer tool of claim 21, said gear transmission means including gear means for causing said predetermined first angular velocity to be greater than said predetermined second angular velocity.

25. The portable hammer tool of claim 24, wherein the difference between said first predetermined angular velocity and said second predetermined angular velocity is the differential angular velocity, said gear transmission means further including means for causing said differential angular velocity to have a value which will cause the impact blows per revolution of said output spindle to be a non-integer number.

26. The portable hammer tool of claim 25, said non-integer number being greater than 1.

27. The portable hammer tool of claim 24 wherein the difference between said predetermined first angular velocity and said predetermined second angular velocity is the differential angular velocity, and wherein said gear transmission means includes speed changing means for changing said differential angular velocity.

28. The portable hammer tool of claim 27, said gear transmission means further including means for causing said differential angular velocity to have a value which will cause the impact blows per revolution of said output spindle to be a non-integer number.

29. The portable hammer tool of claim 28, said non-integer number being greater than 1.

30. A portable hammer tool such as a rotary-hammer, hammer-drill or the like comprising:

a motor housing;

a gear case cover secured to said motor housing;

a gear case secured to said motor housing forwardly of said gear case cover;

a motor in said motor housing having a shaft journaled in said gear case cover and projecting within said gear case;

a pinion formed on the end of said motor shaft;

an output spindle for holding a tool bit, said output spindle having a longitudinal axis and being rotatably journaled in said gear case so as to be also slideable in the direction of said longitudinal axis;

first ratcheting means mounted on said output spindle so as to be rotatable with respect thereto;

second ratcheting means also mounted on said output spindle so as to be rotatable with respect thereto, said second ratcheting means being disposed axially of said first ratcheting means so as to be in confronting relation to the latter;

said output spindle including means for restraining the movement of said second ratcheting means in at least one direction along said longitudinal axis;

resilient means for resiliently holding said first and second ratcheting means in spaced apart relation to each other; and, gear transmission means operatively connected to said pinion for simultaneously rotating said first ratcheting means at a predetermined first angular velocity and for rotating said second ratcheting means at a predetermined second angular velocity whereby one of said ratcheting means ratchets over the other one of said ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means, said gear transmission means also including means for rotating said output spindle at a predetermined third angular velocity.

31. The portable hammer tool of claim 30 wherein the difference between said first predetermined angular velocity and said second predetermined angular velocity is the differential angular velocity, said gear transmission means including gear means for causing said differential angular velocity to have a value which will cause the impact blows per revolution of said output spindle to be a non-integer number.

32. The portable hammer tool of claim 31, said non-integer being greater than 1.

33. The portable hammer tool of claim 30, said gear transmission means including gear means for causing said predetermined first angular velocity to be greater than said predetermined second angular velocity.

34. The portable hammer tool of claim 33, wherein the difference between said first predetermined angular velocity and said second predetermined angular velocity is the differential angular velocity, said gear transmission means further including means for causing said differential angular velocity to have a value which will cause the impact blows per revolution of said output spindle to be a non-integer number.

35. The portable hammer tool of claim 34, said non-integer number being greater than 1.

36. A portable hammer tool such as a rotary hammer, hammer drill or the like comprising:

a motor housing;

a gear case secured to said motor housing forwardly of said gear case cover;

a motor in said motor housing having a shaft projecting into said gear case;

a pinion formed on the end of said motor shaft;

first ratcheting means rotatably journaled in said gear case;

an output spindle for holding a tool bit, said output spindle having a longitudinal axis and being rotatably journalled in said gear case so as to be also slideable in the direction of said longitudinal axis;

second ratcheting means mounted to said output spindle so as to be in confronting relation to said first ratchet means;

resilient means providing a resilient force for holding said first and said second ratcheting means in spaced apart relation to each other;

gear transmission means operatively connected to said pinion for simultaneously rotating said first ratcheting means at a predetermined first angular velocity and for rotating said second ratcheting means at a predetermined second angular velocity whereby one of said ratcheting means ratchets over the other one of said ratcheting means thereby imparting longitudinal impact blows to said output spindle when said first ratcheting means and said second ratcheting means mutually engage in response to an axial movement of said output spindle caused by the tool being pressed toward a work surface against the resilient force developed by said resilient means, the difference between said predetermined first angular velocity and said predetermined second angular velocity being the differential angular velocity; and, said gear transmission means including speed changing means for changing said differential angular velocity.

37. The portable hammer tool of claim 36, said gear transmission means further including means for causing said differential angular velocity to have a value which will cause the impact blows per revolution of said output spindle to be a non-integer number.

38. The portable hammer tool of claim 37, said non-integer number being greater than 1.

39. The portable hammer tool of claim 36, said gear transmission means including gear means for causing said predetermined first angular velocity to be greater than said predetermined second angular velocity.

40. The portable hammer tool of claim 39, said gear transmission means further including means for causing said differential angular velocity to have a value which will cause the impact blows per revolution of said output spindle to be a non-integer number.

41. The portable hammer tool of claim 40, said non-integer number being greater than 1.

42. In a hammer tool equipped with a motor housing, a gear case secured to the motor housing, a motor in the motor housing having a shaft projecting into the gear case, the shaft having a pinion formed on the end thereof projecting into the gear case, an output spindle for holding a tool bit, said output spindle having a longitudinal axis and being rotatably journaled in said gear case so as to be also slideable in the direction of said longitudinal axis, and wherein the improvement comprises a ratcheting arrangement including:

first ratcheting means rotatably journaled in said gear case;

second ratcheting means mounted on said output spindle axially of said first ratcheting means so as to be in confronting relation to the latter;

resilient means for resiliently holding said first and second ratcheting means in spaced apart relation to each other; and, gear transmission means operatively connected to said pinion for simultaneously rotating said first ratcheting means at a predetermined first angular velocity and for rotating said second ratcheting means at a predetermined second angular velocity whereby one of said ratcheting means ratchets over the other one of said ratcheting means thereby imparting longitudinal impact blows to said output spindle when said first ratcheting means and said second ratchet means mutually engage in response to an axial movement of said output spindle caused by the tool being pressed toward a work surface against the resilient force developed by said resilient means.

43. The hammer tool of claim 42, wherein the difference between said first predetermined angular velocity and said second predetermined angular velocity is the differential angular velocity, said gear transmission means including gear means for causing said differential angular velocity to have a value which will cause the impact blows per revolution of said output spindle to be a non-integer number.

44. The hammer tool of claim 43, said non-integer member being greater than 1.

45. The hammer tool of claim 42, said gear transmission means including gear means for causing said predetermined first angular velocity to be greater than said predetermined second angular velocity.

46. The hammer tool of claim 45, wherein the difference between said first predetermined angular velocity and said second predetermined angular velocity is the differential angular velocity, said gear transmission means further including means for causing said differential angular velocity to have a value which will cause the impact blows per revolution of said output spindle to be a non-integer number.

47. The hammer tool of claim 46, said non-integer number being greater than 1.

48. The hammer tool of claim 45, wherein the difference between said first predetermined angular velocity and said second predetermined angular velocity is the differential angular velocity, said gear transmission means including speed changing means for changing said differential angular velocity.

49. The hammer tool of claim 48, said gear transmission means including gear means for causing said differential angular velocity to have a value which will cause the impact blows per revolution of said output spindle to be a non-integer number.

50. The portable hammer tool of claim 49, said non-integer being greater than 1.

51. The hammer tool of claim 45 comprising a body of predetermined mass rotatably journaled in said gear case, said first ratcheting means being formed on said body.

* * * * *